United States Patent [19]

Tsubota

[11] Patent Number: 4,661,867
[45] Date of Patent: Apr. 28, 1987

[54] CASSETTE LOADING DEVICE AND METHOD

[75] Inventor: Shinya Tsubota, Katsuta, Japan

[73] Assignee: Hitachi, Ltd., Tokyo, Japan

[21] Appl. No.: 783,364

[22] Filed: Oct. 3, 1985

[30] Foreign Application Priority Data

Oct. 3, 1984 [JP] Japan ................................ 59-206410

[51] Int. Cl.⁴ ............................................ G11B 15/18
[52] U.S. Cl. .................................. 360/96.5; 360/105; 242/198
[58] Field of Search .......................... 360/96.5, 71, 105; 242/197–200

[56] References Cited

U.S. PATENT DOCUMENTS

| 4,099,213 | 7/1978 | Schatteman | 360/96.5 |
| 4,423,445 | 12/1983 | Okada et al. | 360/96.5 |
| 4,466,030 | 8/1984 | Kato | 360/96.5 |
| 4,568,990 | 2/1986 | Ueno et al. | 360/96.5 |

FOREIGN PATENT DOCUMENTS 0084069 6/1980 Japan ................... 360/96.5

Primary Examiner—A. Michael Chambers
Attorney, Agent, or Firm—Antonelli, Terry & Wands

[57] ABSTRACT

A cassette loading device comprises a motor rotatable in a normal direction and in a reverse direction, a driving mechanism for transmitting a power of the motor to a cassette holder and moving the cassette holder, and elastic member mounted on the driving mechanism for generating an elastic force against a depression of a tape cassette when the tape cassette is depressed from an initial position to a cassette-in position. A position detecting device detects that the cassette holder reaches a predetermined position in its moving path and generates a signal, with an initial position detecting device detecting an initial position of the elastic member upon initializing generating a signal. An eject signal generating device generates a signal commanding a cassette unloading, and a micro-processor controls the motor in response to output signals from the position detecting device, the initial position detecting device and the eject signal generating device. The tape cassette is forcibly unloaded irrespective of the elastic force of the elastic member.

9 Claims, 13 Drawing Figures

CASSETTE LOADING DEVICE AND METHOD

BACKGROUND OF THE INVENTION

The present invention relates to a method of loading a cassette and a cassette loading device for a cassette type magnetic recording and playback equipment and, more particularly, to a cassette loading device by which an unloading of a cassette may be carried out without fail even if the device is applied to a portable magnetic recording and playback equipment usable in any desired posture.

In FIG. 12, a conventional cassette loading device for front loading cassette type magnetic recording and playback equipment such as, for example, a video tape recorder (VTR) of a stationary type, that is, non-portable type is proposed which includes a device for loading a tape cassette K.

The tape cassette K is held at an initial position where the cassette projects a distance d outwardly from a front opening of the VTR. When the cassette K is manually inserted from the initial position, the cassette K reaches a position indicated by a dotted line in FIG. 12.

The loading device of FIG. 12 is constructed so that, as the cassette K is inserted from the initial position to the position indicated by the dotted line, the insertion (stroke) is performed against a elastic force of elastic means such as a spring, not shown. Therefore, when the cassette reaches the dotted line position; that is, the cassette reaches a stroke absorption condition, the elastic means is deformed to an energy stored condition. This elastic means will be referred to as a stroke absorption spring and a magnitude of the spring force of the stroke absorption spring determines the operational feeling at the time of insertion of the cassette.

Subsequently, when the cassette K reaches the dotted line position, a cassette position detecting means (not shown) detects the cassette position to actuate a motor (not shown). Thereafter, a driving mechanism composed of a gear train is operated by the output power of the motor so that the cassette K is moved horizontally rearwardly and is further moved in the vertical direction to reach a predetermined set position P. Then, the cassette position is detected by the cassette position detecting means, thereby stopping the motor.

When the loading operation of the tape cassette is thus finished, the operation mode will shift to a playback mode.

By manually pushing an eject button (not shown) the motor starts a reverse rotation, whereby the driving mechanism is operated in the opposite direction so that the cassette K is returned in a direction opposite to the direction of the arrows.

When the cassette K reaches the dotted line position, the cassette position detecting means detects the cassette position to thereby stop the motor. Subsequently, the aforesaid elastic means, held in the energy stored state in this position, causes the cassette K to be pressed outwardly by the distance d with its stored energy being released. Thus, all the components and members are returned back to the initial condition.

A cassette loading device of the aforementioned type is disclosed in, for example, Japanese Patent Unexamined Publication Nos. 12162/83 and 164051/83.

Since the conventional cassette loading device has been applied to the stationary type VTR, there is no serious problem in operation in accordance with the above-described operational principle. However, if such a cassette loading principle is applied to the portable type VTR, the loading device suffers from the following disadvantages.

As shown in FIG. 12, the stationary type VTR is used in the horizontal position however, a portable type VTR is not necessarily used in the horizontal position but rather the portable VTR may be held in a vertical position or suspended from an operator's shoulder to be held in the slant or oblique position.

More particularly, as shown in FIG. 13, there will be no problem in carrying out the loading of the tape cassette K in accordance with the method explained in conjunction with FIG. 12. However, a serious problem arises in the unloading operation of the tape cassette K. More specifically, the cassette K which has been returned from the set position back to the dotted line position by the power of the motor is to be pressed outwardly by the distance d to the solid line position solely by the spring force of the aforesaid elastic means with the motor being held in the stop condition. In this state, if the VTR is held in the vertical position, unlike the case where the VTR is held in the horizontal position, the tape cassette K must be pressed outwardly against a gravitational force of the cassette. Therefore, unless the elastic means meets this requirement, the tape cassette K will not be raised, and it is frequently difficult to unload the tape cassette K.

Of course, if the elastic force of the elastic means is increased, then the cassette K will readily be unloaded. However, in this case, when the cassette K is inserted for the loading, the cassette K must be depressed by the distance d against such an increased elastic force thereby adversely effecting the operational feeling of the cassette.

Accordingly, the aim underlying the invention resides in avoiding the above-noted disadvantages encountered in the prior art by providing a cassette loading device for a magnetic recording and playback equipment in which, even if the recording and playback equipment is held in a vertical position as well as in a horizontal direction, a tape cassette may be positively unloaded without any degradation of operational feeling.

According to advantageous features of the present invention, a cassette loading device is provided which comprises a driving means rotatable in normal and reverse directions, a driving mechanism for transmitting a power of the driving means to a cassette holder to transfer the cassette holder, and an elastic means mounted on the driving mechanism and for generating a elastic force against an inserting force when a tape cassette is inserted from an initial position to a cassette-in position. A position detecting means is provided for detecting the cassette holder reaching a predetermined position in its transfer path and for generating a signal, an initial position detecting means detects an initial position of the elastic means upon an initializing operation, and an eject signal generating means generates a signal for commanding an unloading of the cassette. A micro-processor controls the driving means in response to output signals of the position detecting means, the initial position detecting means and the eject signal generating means.

The tape cassette is inserted against the elastic force of the elastic means from the initial position to the cassette-in position. When the holder reaches the cassette-in position, the position detecting means feeds the signal to the micro-processor. The micro-processor causes the driving means to rotate in the normal direction, thus transferring the cassette holder to the cassette set position. By this normal rotation, the elastic force, stored by the insertion, of the elastic means is dissipated. When the cassette holder reaches the cassette set position, the position detecting means feeds the signal to the micro-processor. The micro-processor casues the driving means to be stopped, thereby completing the loading operation.

In response to the signal from the eject signal generating means, the micro-processor causes the driving means to rotate in a reverse direction, thus transferring the cassette holder to the initial position with the elastic force being stored in the elastic means, to thereby unload the tape cassette. When the cassette holder reaches the initial position, the position detecting means feeds the signal to the micro-processor. The micro-processor causes the driving means to rotate in the normal direction. At this time, the cassette holder is retained in the initial position by the elastic force of the elastic means. When the normal rotation causes the elastic means to reach its initial position, the initial position detecting means feeds the signal to the micro-processor which, in turn, stops the driving means to complete the unloading operation. Thus, the tape cassette is forcibly unloaded irrespective of the spring force of the spring means.

DETAILED DESCRIPTION

Figure 1:
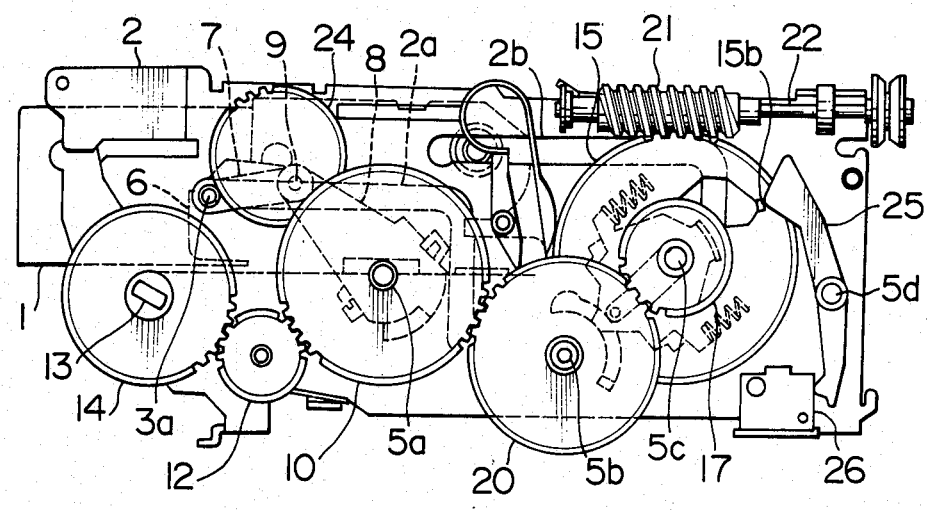
FIG. 1 is a side elevational view of a cassette loading device, kept in the initial condition, in accordance with an embodiment of the invention, from which a gear bracket has been omitted for clarification.
Figure 2:
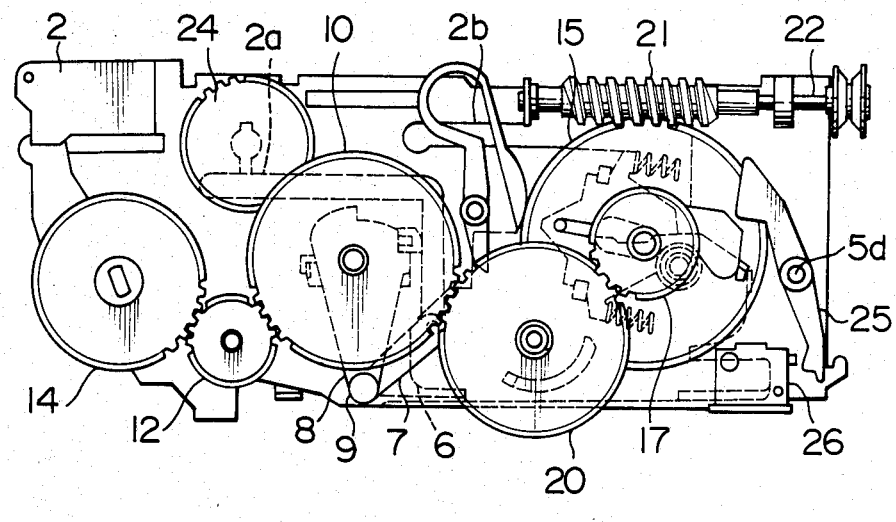
FIG. 2 is a side elevational view of the device in which the cassette is located in a cassette set position, from which the gear bracket has been also omitted.
Figure 3:
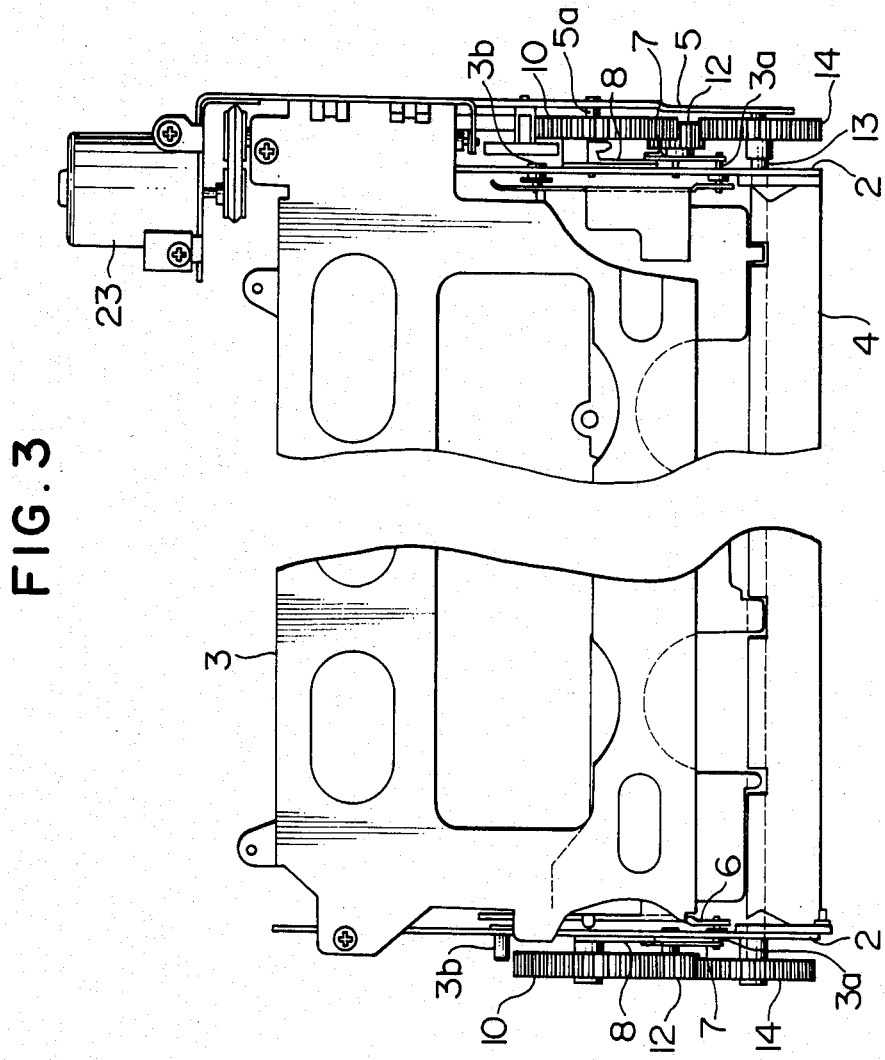
FIG. 3 is a plan view of the device according to the embodiment of the invention.

In accordance with the present invention, as shown in FIG. 1, a cassette 1 is provided in which a magnetic tape is accommodated, with a cassette loading device comprising a pair of side brackets 2, a top plate 3 connecting the pair of side brackets 2 to each other and a front holder 4 (FIG. 3). On the right side bracket 2, there is mounted a gear bracket in which support shafts 5a, 5b, 5c and 5d are mounted as shown in FIG. 1. Guide grooves 2a and 2b are formed in the side brackets 2 for retaining and guiding a cassette holder 6.

Figure 7:
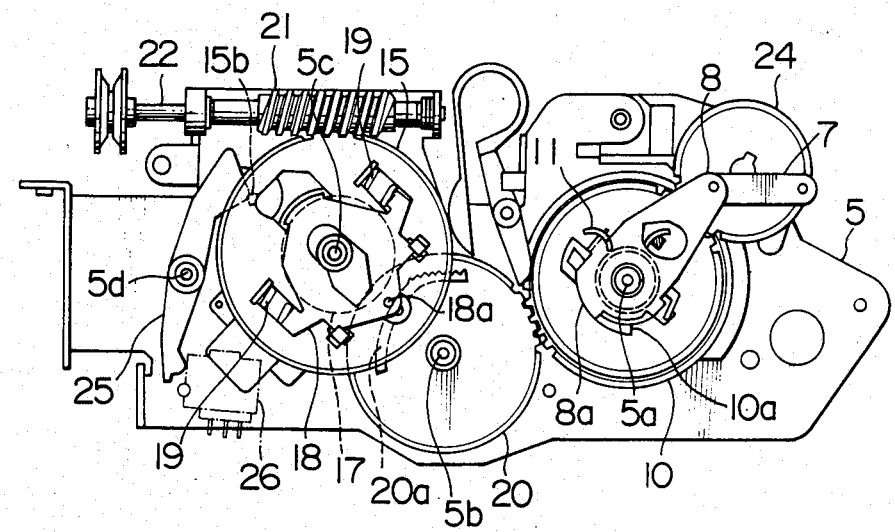
FIG. 7 is a side elevational view of a gear bracket, as viewed from the cassette holder side in an initial position.

The cassette holder 6 is disposed between the pair of side brackets 2, and is provided with guide pins 3a and 3b which are slidingly engaged with the guide grooves 2a and 2b so that the cassette holder 6 is in sliding engagement with the side brackets 2. On the guide pins 3a mounted in the cassette holder 6, there are rotatably mounted one side end of links 7 with the other side end of the links of being respectively rotatably mounted on ends of driving arms 8 through connecting pins 9. A torsion spring 11 is interposed between the driving arm 8 and a driving gear 10 on each side of the loading device as shown in FIG. 7 to resiliently bias the drive arm 8 in the counterclockwise direction in FIG. 7. The movement of the driving arm 8 is restricted by cooperation between a stop portion 8a and a stop portion 10a of the driving gear 10 and is rotatable within a predetermined angle.

On the right side of the loading device, the driving gear 10 and the driving arm 8 are rotatably supported around the support shaft 5a of the gear bracket 5. The driving gear 10 is in mesh with a synchronizing gear 14 through an intermediate or idling gear 12. The right side synchronizing gear 14 is fixed to a synchronizing shaft 13. On the left side bracket 2, the driving gear 10, the driving arm 8, the link 7, the intermediate gear 12 and the synchronizing gear 14 are arranged in the same manner and the left driving gear 14 operates in synchronism with the right driving gear 14 through the synchronizing shaft 13.

Figure 4:
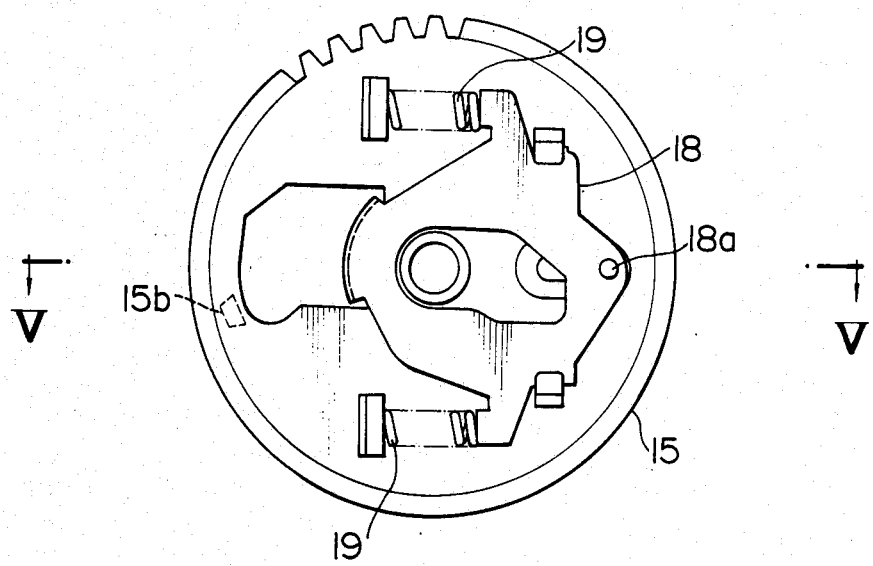
FIG. 4 is a plan view of a worm gear used in the device.
Figure 6:
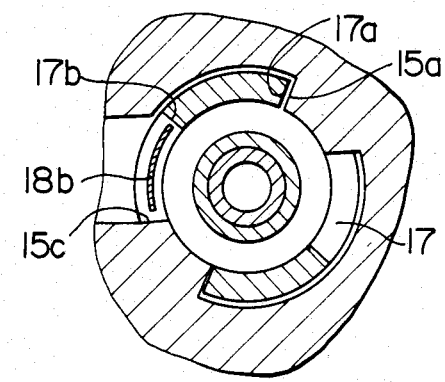
FIG. 6 is a cross-sectional view taken along the line VI—VI of FIG. 5.
Figure 5:
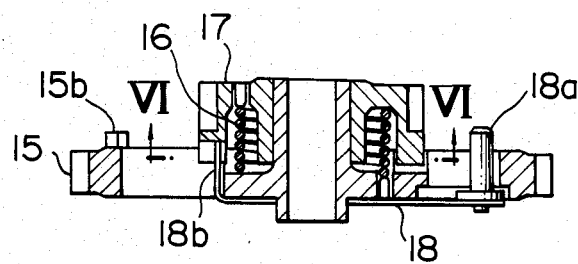
FIG. 5 is a cross-sectional view taken along the loading line V—V of FIG. 4.

As shown in FIGS. 4 through 6, a clutch gear 17 is engaged with a boss portion of a worm wheel 15, and a torsion spring 16 is interposed between the worm wheel 15 and the clutch gear 17. The torsion spring 16 biases the clutch gear 17 so that stop portions 17a of the clutch gear 17 are brought into contact with stop portions 15a of the worm wheel 15. Furthermore, the clutch gear 17 is rotatable within a range defined by the stop portions 15a and 15c of the worm wheel 15.

Also, on the worm wheel 15, a change-over slider 18 is rotatably held together with the worm wheel 15 while the change-over slider 18 is biased in one direction by compression springs 19. At one end of the change-over slider 18, there is formed a stop 18b which is engageable with a space defined between the stop portion 17b of the clutch gear 17 and the stop portion 15c of the worm wheel 15. At the other end of the change-over slider 18, there is mounted a shaft 18a which is adapted to abut a rib 20a of an intermediate gear 20 (see FIG. 7), thus slidingly moving the change-over slider 18 against the compression springs 19. The intermediate gear 20 is in mesh with both the clutch gear 17 and the driving gear 10.

The worm wheel 15 is provided with a projection 15b which can be engaged with one end of a lever rotatably supported around the support shaft 5d. The other end of the lever 25 can be engaged with a switch 26 which detects an initial position of the worm wheel 15 upon initializing operation later described and feeds a signal to a micro-processor (not shown).

A mode switch 24 is in mesh with the driving gear 10. The mode switch 24 is of the rotary type and detects positions of the cassette holder 6 from rotational angles of the driving gear 10 to feed signals to the micro-processor. In other words, the mode switch 24 is constructed so as to feed signals to the micro-processor in accordance with the "initial position", "cassette-in position" and "cassette set position" of the cassette holder 6. The micro-processor controls a motor 23 in response to the signals from the mode switch 24 and the switch 26.

Figure 11:
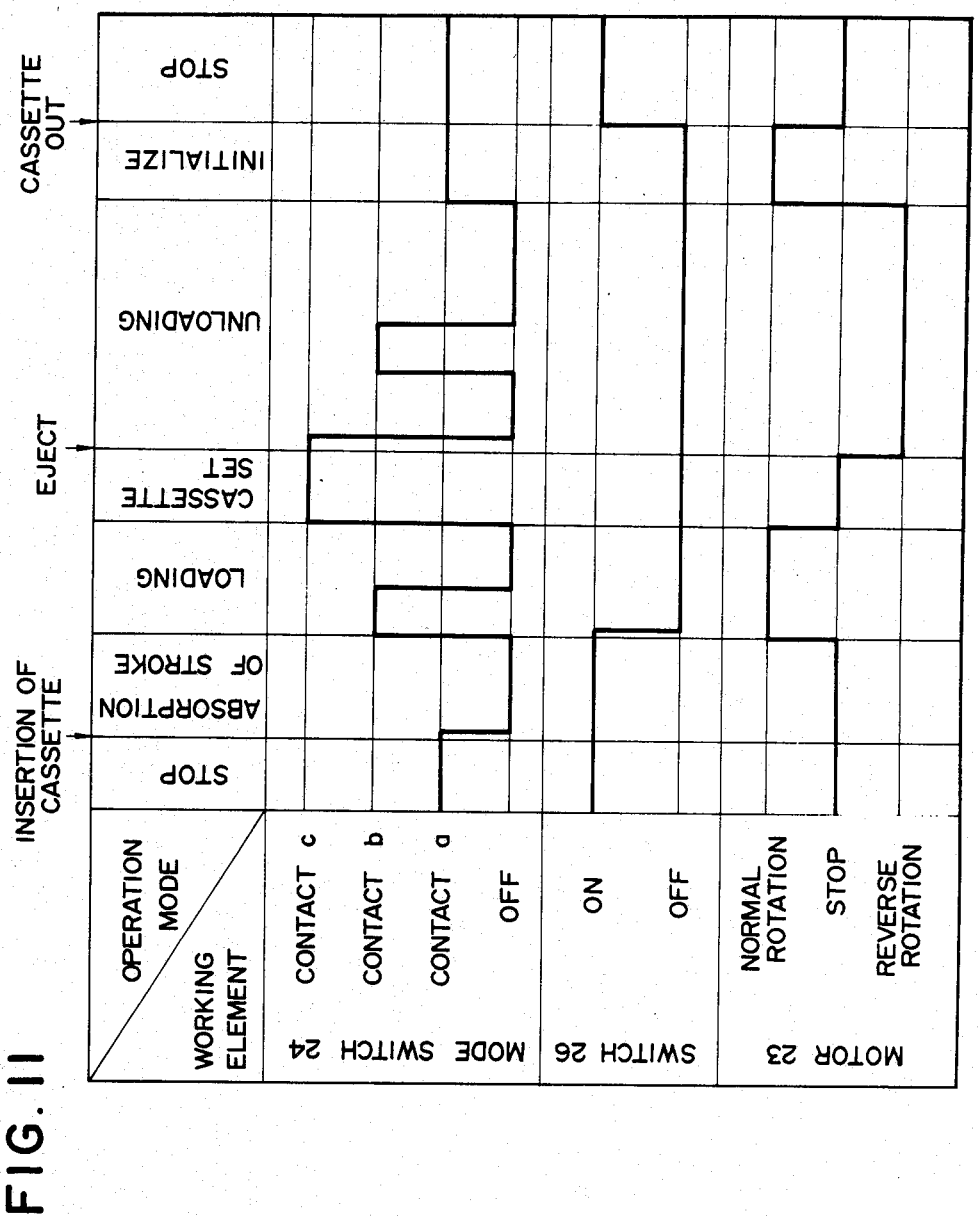
FIG. 11 is a timing chart of respective working elements in the cassette loading and unloading operations.
Figure 12:
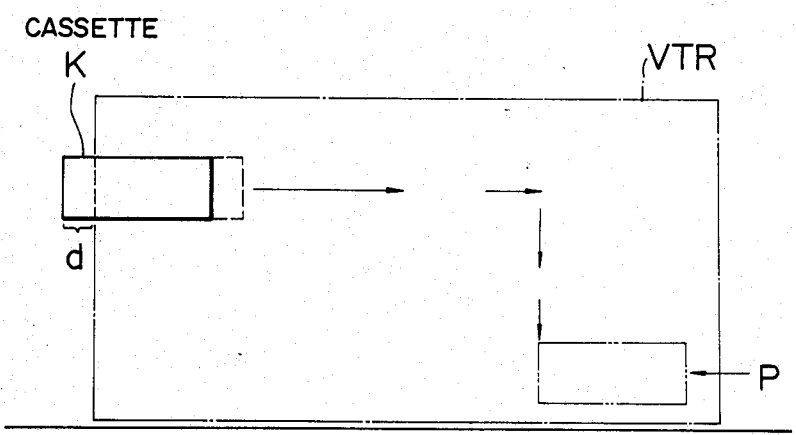
FIG. 12 is a schematic view of a prior art VTR cassette loading device.
Figure 13:
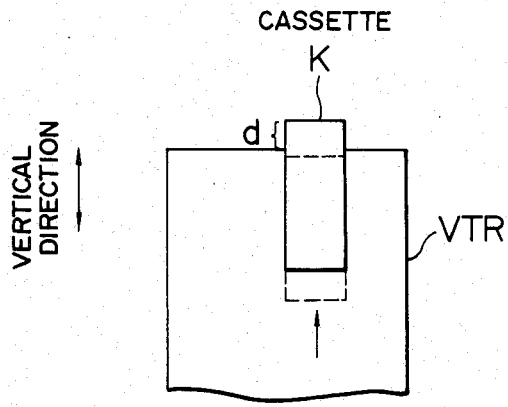
FIG. 13 is a schematic view of the cassette apparatus in the case where the VTR is held in the vertical position.

As shown in FIG. 7, representing the initial condition of the cassette loading device, the mode switch 24 is under such a condition that a contact a thereof corresponding to the "initial position" of the cassette holder 6 is closed as shown in FIG. 11. Furthermore, the switch 26 is "ON" by the contact between the switch lever 25 and the projection 15b of the worm wheel 15. The micro-processor is subjected to the signal representative of the closing of the contact a and the signal representative of the "ON" state of the switch 26, thereby stopping the motor 23.

Subsequently, the cassette 1 is manually inserted into the cassette holder 6 and is depressed thereinto, with the depression causes the driving arms 8 to rotate. This rotation is transmitted through the driving gears 10 and the intermeidate gear 20 to the clutch gear 17. At this time, the shaft 18a of the change-over slider 18 slidably mounted on the worm wheel 15 is brought into abutment with the rib 20a of the intermediate gear 20 to thereby move the change-over slider 18 against the compression springs 19. Namely, the stop 18b of the change-over slider 18 is disengaged from the space defined between the stop portion 17b of the clutch gear 17 and the stop portion 15c of the worm wheel 15. Therefore, the clutch gear 17 and the torsion spring 16 is wound by the rotation of the clutch gear 17 caused by the cassette depression operation.

This condition is referred to as "stroke absorption" condition. If the depression of the cassette 1 is stopped in the midway, the cassette 1 is of course returned back to the initial position by the returning force of the torsion spring 16.

Figure 8:
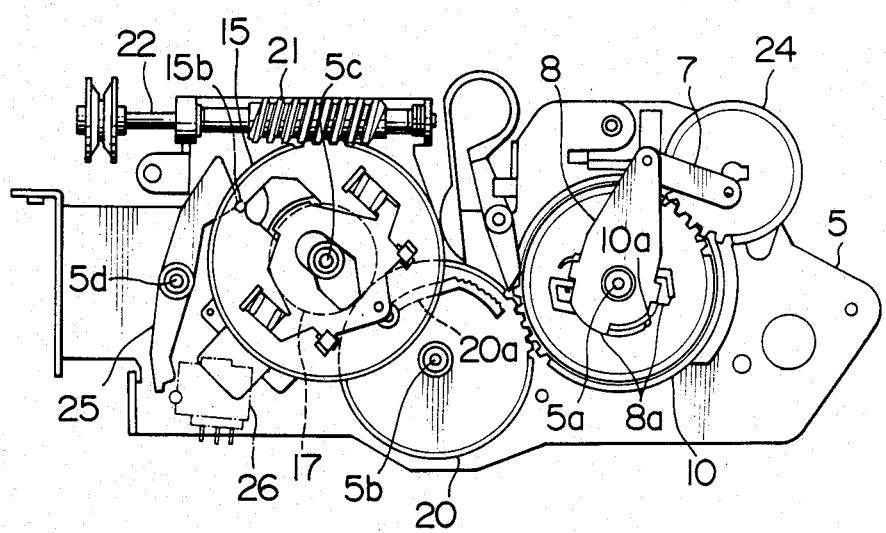
FIG. 8 is a side elevational view, as viewed from the cassette holder side, in the cassette-in position.

As described above, one important factors for improving the operational feeling is to suppress the force of the torsion spring 16. Thus, the stroke of the cassette holder 6 is absorbed by the rotation of the driving gears 10, the intermediate gear 20 and the clutch gear 17 (see FIG. 8).

Simultaneously with the foregoing operation, since the driving gear 10 causes the mode switch 24 to rotate, the mode switch 24 closes its contact b corresponding to the "cassette-in position" of the cassette holder 6 as shown in FIG. 11, thereby applying its signal to the micro-processor.

When the micro-processor receives the signal representative of the "cassette-in position" from the mode switch 24, the motor 23 is rotated in the normal direction. The normal rotation of the motor 23 causes the worm wheel 15 to rotate through the worm 21 (in the counterclockwise direction in FIG. 8). The rotation of the worm wheel 15 is in a direction for dissolving the torsional force of the torsion spring 16, i.e., the torque of the torsion spring 16 exerted by the depression of the cassette 1. The rotation of the worm wheel 15 causes the stop portion 15a of the worm wheel 15 to abut to the stop portion 17a of the clutch gear 17 to rotate the clutch gear 17 together with the worm wheel 15. At this time, since the shaft 18a of the change-over slider 18 is spaced from the rib 20a of the intermediate gear 20, the stop portion 18b of the change-over slider 18 is engaged with the space defined between the stop portion 17b of the clutch gear 17 and the stop portion 15c of the worm wheel 15 as shown in FIG. 6.

Figure 9:
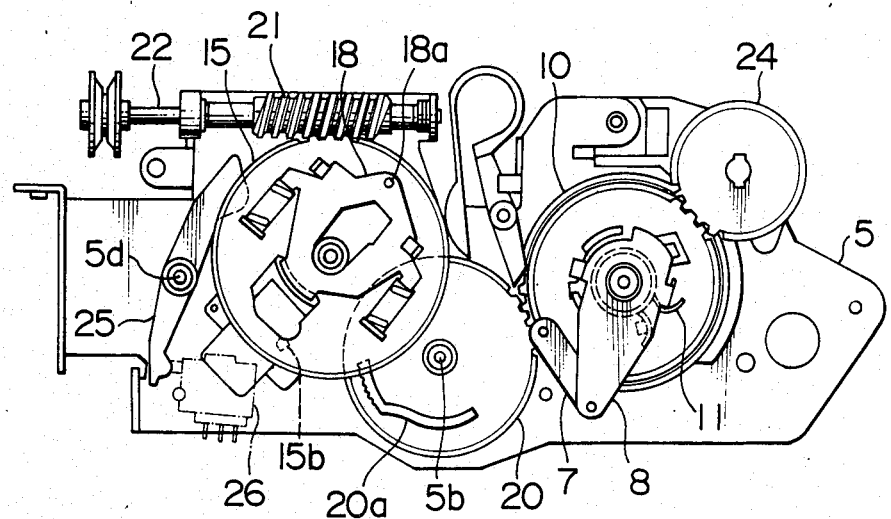
FIG. 9 is a side elevational view of the gear bracket, as viewed from the cassette holder side, illustrating the cassette-set position.
Figure 10:
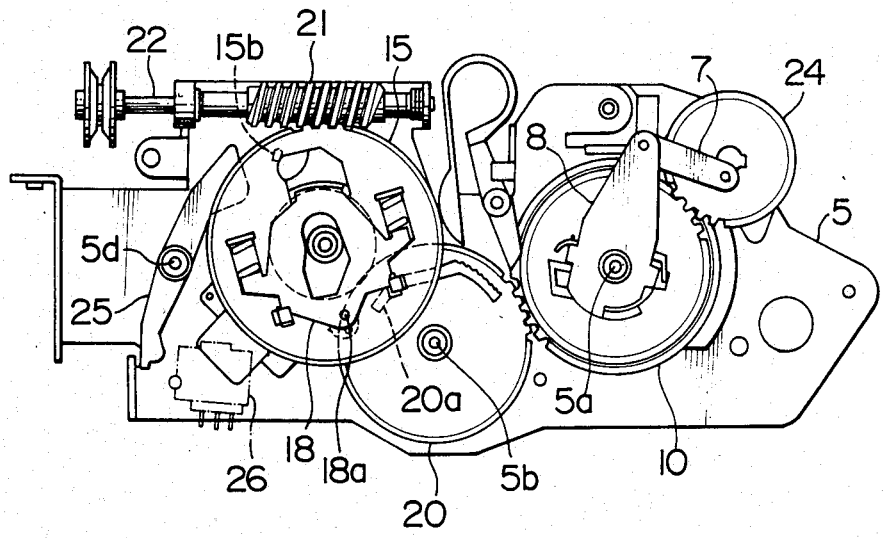
FIG. 10 is a side elevational view of the gear bracket, as viewed from the cassette holder side, illustration an intermediate position between the initial position and the cassette-in position in the unloading operation.

The normal rotation of the motor 23 causes the cassette holder 6 to the moved in the vertical direction to the "cassette set position" after the horizontal movement. The mode switch 24 closes its contact c corresponding to the "cassette set position" and feeds its signal to the micro-processor which in turn stops the motor. Since the cassette 1 is abutted to a level determining pins (not shown) prior to the stop of the motor, the driving gears 10 wind up the torsion springs 11. As a result, the cassette holder 6 is held in pressing contact to the "cassette set position" by the spring force of the torsion springs 11 (see FIGS. 1 and 9).

It is a matter of course that, in the "cassette set position", various operational modes such as recording and playback of image and sound informations are applied to the magnetic tape received in the cassette.

When an eject switch or button (not shown) is depressed, a signal is fed to the micro-processor which, in turn, rotates the motor in the reverse direction. The rotation causes the worm wheel 15 to rotate through the worm 21 in the clockwise direction in FIG. 8. The worm wheel 15 and the clutch gear 17 are in unison with each other by the stop 18b of the change-over slider 18 as described before. The rotation of the clutch gear 17 is transmitted through the intermediate gear 20 to the driving gear 10. As a result, the cassette holder 6 is transferred in the reverse direction to that of the above-described cassette setting operation.

When the cassette holder 6 reaches the "cassette-in position", the mode switch 24 closes its contact b and feeds a signal to the micro-processor but the micro-processor is set in advance so as to disregard this signal. Therefore, the motor 23 continues the reverse rotation. At this time, since the shaft 18a of the change-over slider 18 is again brought into abutment with the rib 20a of the intermediate gear 20, the stop 18b is disengaged from the space defined between the stop portion 17b of the clutch gear 17 and the stop portion 15c of the worm wheel 15. As a result, the worm wheel 15 causes the clutch gear 17 to rotate while its stop portion 15c is in contact with the stop portion 17b of the clutch gear 17, thereby winding up the torsion spring 16. Thus, the cassette is forcibly transferred irrespective of the spring force of the torsion spring 16.

When the cassette holder 6 reaches the "initial position", the mode switch 24 closes its contact a and feeds its signal to the micro-processor. The micro-processor subjected to the signal representative of the closing of the contact a from the mode switch 24 in the reverse rotation immediately causes the motor to rotate in the normal direction.

Also, under the condition that the cassette holder 6 reaches the "initial position", the torsion spring 16 is held in the wound-up state and the worm wheel 15 is held at a position where the worm wheel 15 has been rotated in the clockwise direction from its initial position so that the projection 15b is disengaged from the switch lever 25 to keep the switch 26 in the "OFF" condition.

When the motor 23 rotates in the normal direction, since the clutch gear 17 is urged by the torsion spring 16, only the worm wheel 15 is rotated in the counterclockwise direction and the cassette holder 6 is retained at the initial position. For this reason, the cassette may be freely picked up. When the worm wheel 15 is rotated in the counterclockwise direction and is returned back to the initial position thereof, the projection 15b abuts to the switch lever 25 to make the switch 26 in the "ON" condition. The switch 26 feeds its signal to the micro-processor which in turn stops the motor 23. The operation for returning, by rotating the motor in the normal direction, the worm wheel 15 back to the initial condition, i.e., the condition where the torsion spring 16 may absorb the stroke will be referred to as "initializing". The switch 26 is used only for detecting the initial position of the worm wheel 15 upon the initializing.

Thus, according to the present invention, a torsional torque of the torsion spring 16 may be determined at a level which is a minimum but necessary to resist the gravitational force of the cassette even if the VTR is held in the vertical position. The feeling obtained upon the insertion of the cassette for regular use in light and enjoyable.

The embodiment relates to a cassette loading device in which the change-over slider 18 shown in the foregoing embodiment has been omitted. Except for this modification, the second embodiment, is the same as the first embodiment.

The cassette 1 is inserted into the cassette holder 6 and is depressed thereinto. The depressing operation causes the driving arms 8 to rotate. The rotation is transmitted through the driving gear 10 and the intermediate gear 20 to the clutch gear 17. When the clutch gear 17 is rotated, the torsion spring 16 is wound up to thereby absorb the stroke.

The driving gear 10 rotates the mode switch 24, so that the mode switch 24 closes its contact b corresponding to the "cassette-in position" of the cassette holder 6 and feeds its signal to the micro-processor. The micro-processor rotates the motor 23 in the normal direction. The normal rotation of the motor 23 causes the worm wheel 15 through the worm 21 in the normal direction. This rotation is in the direction in which the torque of the torsion spring caused by the depression of the cassette is dissolved and causes the stop portions 15a of the worm wheel 15 and the stop portions 17a of the clutch gear 17 in abutting relation to thereby rotate the clutch gear 17 together with the worm wheel 15.

By the normal rotation of the motor 23, the cassette holder 6 is moved in the vertical direction after the horizontal movement to the "cassette-in position". The mode switch 24 closes its contact c corresponding to the "cassette set position" and feeds its signal to the micro-processor which in turn stops the motor, thus completing the loading of the cassette.

Subsequently, when the eject button is depressed, an associated signal is fed to the micro-processor which, in turn, rotates the motor 23 in the reverse direction. The worm wheel 15 is also rotated in the reverse direction to rotate the clutch gear 17 under the condition that the torsion spring 16 is wound up. Even in a load to unload the cassette is large, since the stop portions 15c of the worm wheel 15 and the stop portions 17b of the clutch gear 17 are engaged with each other, the positive movement of the cassette holder 6 is ensured. The cassette holder 6 is moved past the "cassette-in position" to the "initial position". The signal from the mode switch 24 to the micro-processor in the "cassette-in position" is disregarded as in the first embodiment. In accordance with the signal from the mode switch 24 in the "initial position", the micro-processor causes the motor 23 to rotate in the normal direction to thereby complete the initializing. In the initializing, the same operation as that in the first embodiment is carried out also in the second embodiment.

The second embodiment differs from the first embodiment in winding step of the torsion spring 16 in the unloading operation. In the first embodiment, the winding step is carried out after the "cassette-in position", whereas, in the second embodiment, the winding step is carried out immediately after the command from the eject button. For this reason, in the second embodiment, there is a slight unstability in moving the cassette holder 6 through the torsion spring 16 in the unloading operation but the change-over slider 18, the compression springs 19 and the rib 20a can be omitted.

Thus, also according to the second embodiment, a torsional torque of the torsion spring 16 may be determined at a level which is weak but necessary to resist the gravitational force of the cassette even if the VTR is held in the vertical position. It is possible to provide a cassette loading device in which the operational feeling obtained upon the insertion of the cassette for regular use is excellent, and the cassette may be unloaded without fail by the motor driving power.

I claim:

1. A cassette loading device comprising:
    motor means rotatable in a normal direction and in a reverse direction;
    a driving mechanism for transmitting a power of said motor means to a cassette holder and moving said cassette holder between an initial position and a cassette-set position;
    elastic means mounted on said driving mechanism for generating an elastic force against a manual depression of a tape cassette when the tape cassette is manually depressed from an initial position to the cassette-in position;
    position detecting means for detecting that said cassette holer reaches predetermined positions in its moving path to generate respective signals, said predetermined positions being said initial position, said cassette-in position, and said cassette-set position;
    initial position detecting means for detecting an initial position of said elastic means upon initializing to generate a signal, said initializing being in an unloading process of the cassette for returning said elastic means to the initial condition thereof;
    eject signal generating means for generating a signal commanding unloading of the cassette; and
    a micro-processor for controlling said motor means in response to the signals from said position detecting means, said initial position detecting means and said eject signal generating means, said micro-processor rotating said motor means in a normal direction and dissipating the force stored in said elastic means caused by said manual depression upon receipt of the signal of the cassette-in position from said position detecting means and stopping said motor means upon receipt of the signal of the cassette-set position from said position detecting means, whereby the cassette is set in the cassette-set position, and wherein said micro-processor causes a rotating of said motor means in a reverse direction so as to store the elastic force in said elastic means upon receipt of a signal of an ejection from the eject signal generating means and for causing a rotation of said motor means in a normal direction upon a dissipation of the elastic force stored in the elastic means by the reverse rotation of the motor means upon receipt of the signal of the initial position of said cassette holder from said position detecting means, and stopping said motor means upon receipt of a signal from the initial position of the elastic means from said initial position detecting means, whereby the cassette is ejected by the motor means and the elastic means is returned to the initial position.

2. The device according to claim 1, further comprising a clutch mechanism for controlling the action of said elastic means.

3. The device according to claim 1, wherein said driving mechanism comprises:
a worm associated with said driving means;
a worm wheel engaged with said worm;
a clutch gear engaged with a boss portion of said worm wheel and having a stop portion engageable between stop portions of said worm wheel;
an intermeidate gear meshed with said clutch gear;
a drive gear meshed with said intermediate gear; and
driving arm mounted on said drive gear and pivotally coupled to said cassette holder.

4. The device according to claim 1, wherein said elastic means comprises a torsion spring interposed between a worm wheel and a clutch gear of said driving mechanism.

5. The device according to claim 1, wherein said position detecting means comprises a rotary type mode switch engaged with a driving gear of said driving mechanism.

6. The device according to claim 5, wherein said mode switch detects the initial position, cassette-in position and cassette set position of said cassette holder.

7. The device according to claim 1, wherein said initial position detecting means comprises a switch lever rotatably supported to a gear bracket; a projection formed on a worm wheel of said driving mechanism and engageable with one end of said switch lever and a switch actuated by the other end of said switch lever.

8. A device comprising:
driving means rotatable in a normal direction and in a reverse direction;
a driving mechanism for transmitting a power of said driving means to a cassette holder and moving said cassette holder;
elastic means mounted on said driving mechanism for generating an elastic force against a depression of a tape cassette when the tape cassette is depressed from an initial position to a cassette-in position;
position detecting means for detecting that said cassette holder reaches a predetermined position in its moving path to generate a signal;
initial position detecting means for detecting an initial position of said elastic means upon a initializing to generate a signal;
eject signal generating means for generating a signal commanding a cassette unloading;
a micro-processor for controlling said driving means in response to the signals from said position detecting means, said initial position detecting means and said eject signal generating means whereby the tape cassette is forcibly unloaded regardless of the elastic force of said elastic means; and
a clutch mechanism for controlling the action of said elastic means, said clutch mechanism comprising a change-over slider slidably mounted on a worm wheel of said driving mechanism and having at one end a stop engageable with a space defined between stop portions of a clutch gear and said worm wheel and at the other end a shaft mounted thereon; compression springs for urging said change-over slider in one direction; and a rib formed on an intermediate gear of said driving mechanism and engageable with said mounted shaft.

9. A cassette loading method comprising the steps of:
a cassette loading step including:
manually depressing a tape cassette against an elastic force of elastic means from an initial position to a cassette-in position, and
rotating a motor means in a normal direction and dissipating an increment of the elastic force of said elastic means caused by said manual depressing to move said tape cassette located in the cassette-in position to a cassette set position, and
a cassette unloading step including:
rotating said motor means in a reverse direction to increase the elastic force of said elastic means to move said tape cassette, located in the cassette set position, past the cassette-in position to the initial position, and
rotating said motor means in the normal direction again to dissipate the increment of the elastic force of said elastic means caused by said reverse rotation to return said elastic means back to its initial position, whereby said tape cassette is is ejected by said motor means.

* * * * *